US012767136B2

(12) United States Patent
Jundt

(10) Patent No.: US 12,767,136 B2
(45) Date of Patent: Oct. 20, 2026

(54) METHOD FOR STABILIZING A VEHICLE IN A START-UP SITUATION FROM A STANDSTILL

(71) Applicant: KNORR-BREMSE SYSTEME FUER NUTZFAHRZEUGE GMBH, Munich (DE)

(72) Inventor: Oliver Jundt, Hessigheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 71 days.

(21) Appl. No.: 18/885,059

(22) Filed: Sep. 13, 2024

(65) Prior Publication Data

US 2025/0128712 A1 Apr. 24, 2025

(30) Foreign Application Priority Data

Oct. 20, 2023 (DE) ..................... 10 2023 128 836.9

(51) Int. Cl.

| | |
|---|---|
| ***B60W 30/18*** | (2012.01) |
| ***B60W 10/04*** | (2006.01) |
| ***B60W 30/02*** | (2012.01) |
| ***B60W 50/00*** | (2006.01) |

(52) U.S. Cl.

CPC ...... *B60W 30/18027* (2013.01); *B60W 10/04* (2013.01); *B60W 30/02* (2013.01); *B60W 50/00* (2013.01); *B60W 2050/0028* (2013.01); *B60W 2520/10* (2013.01); *B60W 2520/125* (2013.01); *B60W 2520/28* (2013.01)

(58) Field of Classification Search

CPC ........... B60W 30/18027; B60W 10/04; B60W 30/02; B60W 50/00; B60W 2520/125; B60W 2520/28; B60W 2520/14

See application file for complete search history.

(56) References Cited

U.S. PATENT DOCUMENTS

| | | | | |
|---|---|---|---|---|
| 4,946,015 | A * | 8/1990 | Browalski | B60T 8/175 180/197 |
| 8,175,785 | B2 * | 5/2012 | Turski | B60W 30/18027 701/84 |
| 11,472,410 | B2 * | 10/2022 | Pettersson | B60W 10/02 |
| 2003/0125847 | A1 * | 7/2003 | Tinskey | B60T 8/1755 701/1 |
| 2010/0161188 | A1 | 6/2010 | Turski et al. | |
| 2020/0122534 | A1 * | 4/2020 | Glugla | B60C 23/0476 |

FOREIGN PATENT DOCUMENTS

| | | |
|---|---|---|
| EP | 1993867 B1 | 8/2010 |

* cited by examiner

*Primary Examiner* — George C Jin

(74) *Attorney, Agent, or Firm* — NORTON ROSE FULBRIGHT US LLP

(57) ABSTRACT

A method for stabilizing a vehicle in a start-up situation from a standstill, wherein the vehicle is driven by a driving machine which generates a driving torque on driven wheels during the start-up process, including at least the following: a) the start-up situation of the vehicle is detected and in the case of the detected start-up situation, b) the actual behavior of the vehicle is determined with regard to the lateral dynamics of the vehicle, c) a deviation of the actual behavior of the vehicle from the target behavior of the vehicle is determined with regard to the lateral dynamics of the vehicle, and d) an adjustment of the drive torque is carried out depending on the deviation.

19 Claims, 2 Drawing Sheets

METHOD FOR STABILIZING A VEHICLE IN A START-UP SITUATION FROM A STANDSTILL

RELATED APPLICATION INFORMATION

The present application claims priority to and the benefit of German patent application No. 10 2023 128 836.9, which was filed in Germany on Oct. 20, 2023, the disclosure of which is incorporated herein by reference.

FIELD OF THE INVENTION

The invention relates to a method for stabilizing a vehicle in a start-up situation from a standstill, wherein the vehicle is driven by a driving machine which generates a driving torque on driven wheels during the start-up process, as described herein. Furthermore, the invention also relates to an apparatus for carrying out the method as described herein.

BACKGROUND INFORMATION

If the driven wheels of a vehicle spin from a standstill during a start-up situation, due to the drive slip no or too little longitudinal force can be transmitted between the driven wheels and the road surface in order to accelerate the vehicle as desired, and/or no or too little lateral force can be transmitted between the driven wheels and the road. Especially with a lateral inclination and/or a low coefficient of friction of the road, this can lead to the vehicle slipping sideways.

In the case of known traction control systems (ASR), spin of driven wheels under impermissibly high slip can be detected, whereupon the drive torque on the impermissibly highly slipping driven wheels is reduced and/or the impermissibly highly slipping driven wheels are braked in a targeted manner. The traction control system (ASR) must make a compromise between speedy pulling away (allow higher slip) and driving stability (allow lower slip). However, there are situations in which this compromise can lead to the vehicle becoming unstable in terms of lateral dynamics and sliding sideways.

Today's ESP systems (which can also be integrated into a braking system) will not intervene in such a situation, because at the very low speeds prevailing in a start-up situation, a lower activation speed threshold of the ESP has not yet been reached and/or, initializations cannot yet be completed at a standstill and/or braking interventions on the non-driven front axle do not engage as an antidote to oversteer.

If the start-up situation is controlled by a driver, he can recognize a critical situation that arises with regard to the lateral dynamics when starting off and can take his foot off the accelerator. Counter steering, on the other hand, would not lead to success, as the vehicle is essentially still at a standstill or only starts at a very low speed in the start-up situation.

In autonomous controlled vehicles, on the other hand, no driver can intervene and even a HAD (Highly Autonomous Driving) function could not compensate for lateral dynamic instability. This is because even if such a situation could be detected by camera data and then an attempt could be made to automatically counteract it by changing the trajectory specification, this changed trajectory could not be adjusted or not completely adjusted by an applied steering torque due to the very low speed or standstill in the start-up situation.

SUMMARY OF THE INVENTION

The object of the invention, on the other hand, is to specify a method and an apparatus that can avoid driving instability in a start-up situation.

According to the invention, this object may be achieved by the features of the embodiments as described herein.

According to a first aspect, the invention provides for a method for stabilizing a vehicle in a start-up situation from a standstill, wherein the vehicle is driven by a driving machine which generates a driving torque on driven wheels during the start-up process, including at least the following steps:

a) the start-up situation of the vehicle is detected and when the start-up situation is detected, b) the actual behavior of the vehicle is determined with regard to the lateral dynamics of the vehicle, and c) a deviation of the actual behavior of the vehicle from a target behavior of the vehicle with regard to the lateral dynamics of the vehicle is determined, and d) an adjustment of the drive torque is carried out depending on the deviation.

The invention has recognized that in a start-up situation with lateral dynamic instability, there is a need for greater lateral guidance force on the driven wheels of the vehicle. This is achieved by adapting and, in particular, reducing the drive torque as a function of the deviation between the actual behavior of the vehicle and the target behavior of the vehicle with regard to the lateral dynamic behavior.

The method may be carried out in the form of an (additional) start-up stability function or is implemented as an (additional) start-up stability function in an electronic control system. This start-up stability function may be provided outside or in addition to a standard driving stability control system such as ESP and/or outside or in addition to a standard traction control system (ASR).

The measures listed in the dependent claims enable advantageous developments and improvements to the invention specified in claim 1.

A detected actual vehicle rotation rate of the vehicle may represent the actual behavior of the vehicle and a target rotation rate of the vehicle may represent the target behavior of the vehicle. The deviation is then formed, for example, by a difference between the target rotation rate of the vehicle and the actual rotation rate of the vehicle. The magnitude of this difference may be determined.

The target rotation rate of the vehicle may be determined using the single-track model according to the following equation:

$$\psi = \frac{\delta * v}{l_{wh} + EG * v^2}$$

with:

$\psi$=target rotation rate $\delta$=wheel steering angle v=vehicle speed

EG=self-steering gradient $l_{wh}$=wheelbase

The vehicle speed (v) may be detected by evaluating the rotation rate of at least one non-driven wheel.

Alternatively, a predetermined value can be used as the target rotation rate of the vehicle.

With the method, in addition or alternatively a detected actual lateral acceleration of the vehicle can also represent the actual behavior of the vehicle and, in particular, a specified or determined target lateral acceleration of the vehicle can represent the target behavior of the vehicle. The deviation is then formed, for example, by a difference between the target lateral acceleration of the vehicle and the actual lateral acceleration of the vehicle. The magnitude of this difference may be determined.

The method can also detect the start-up situation of the vehicle by evaluating the rotation rate of at least one non-driven wheel.

With the method, the start-up situation of the vehicle may be detected by determining that a vehicle speed detected by at least one sensor increases from zero to a (lower) vehicle limit speed.

Particularly, with this method, the drive torque generated by the driving machine may be reduced depending on the deviation. Reducing the drive torque means that a lower or reduced drive torque is requested compared to a drive torque requested by the driver or autonomously. Also, the greater the deviation, the more the drive torque generated by the driving machine during the start-up process can be reduced. If, for example, the deviation exceeds a limit value, then the drive torque generated by the driving machine is reduced. This limit value can be fixed or can be dependent on a lower vehicle limit speed, from which wheel rotation rates can be detected.

According to an initial design, with the method the drive slip can be determined at least during the start-up situation and then the adjustment and in particular the reduction of the drive torque can be achieved by specifying a maximum permissible drive slip for the driven wheels, which is smaller than a target drive slip specified by a traction control system (ASR). According to a second design, which is may be used, the adjustment and in particular the reduction of the drive torque can be achieved by (directly) controlling the driving machine in order to adjust and, in particular, reduce the drive torque.

With the method, the start-up situation can also be triggered by a driver of the vehicle or autonomously, in particular by an autopilot.

According to a second aspect, the invention proposes an apparatus for carrying out the method described above, including at least:

a) first means that are set up and configured for detecting the start-up situation of the vehicle,
b) second means that are set up and configured for determining the actual and target behavior of the vehicle with regard to the lateral dynamics of the vehicle,
c) third means, which are set up and configured for adjusting the drive torque depending on the deviation.

The apparatus may include:

a) the first means can contain at least one wheel rotation rate sensor on a non-driven wheel for generating a wheel rotation rate signal and an electronic control system with a signal transfer connection to this for evaluating the wheel rotation rate signal, and
b) the second means can contain at least one rotation rate sensor for generating a rotation rate signal and/or at least one lateral acceleration sensor for generating a lateral acceleration signal and the electronic controller with a signal transfer connection to this for evaluating the rotation rate signal and/or the lateral acceleration signal, and
c) the third means can contain the electronic controller, and
c1) a drive control electronic system with a signal transfer connection to the electronic control system, which receives and implements a drive control signal generated by the electronic control system depending on the deviation, or
c2) a traction control system (ASR) with a signal transfer connection to the electronic control system, which receives and implements a slip specification signal representing a maximum permissible drive slip generated by the electronic control system depending on the deviation.

Particularly, the electronic controller is integrated into an electronic brake control unit of a braking system of the vehicle. The braking system can be an electro-pneumatic braking system, in particular an electronically controlled braking system (EBS). In general, however, the braking system can be a pneumatic, electro-pneumatic, hydraulic, electro-hydraulic or electric braking system.

Advantageous developments of the invention result from the patent claims, the description and the drawings. The advantages of features and combinations of several features mentioned in the introduction to the description are merely exemplary and can be effected alternatively or cumulatively, without the advantages necessarily having to be achieved by embodiments according to the invention. Further features can be found in the drawings—in particular the geometries shown and the relative dimensions of several components to each other as well as their relative arrangement and active connection. The combination of features of different embodiments of the invention or features of different patent claims deviating from the selected references of the patent claims is also possible and is hereby encouraged. This also applies to those features that are shown in separate drawings or are mentioned in the description thereof. These features can also be combined with features of different patent claims. Likewise, features listed in the patent claims can be omitted for further embodiments of the invention.

DETAILED DESCRIPTION

Figure 1:
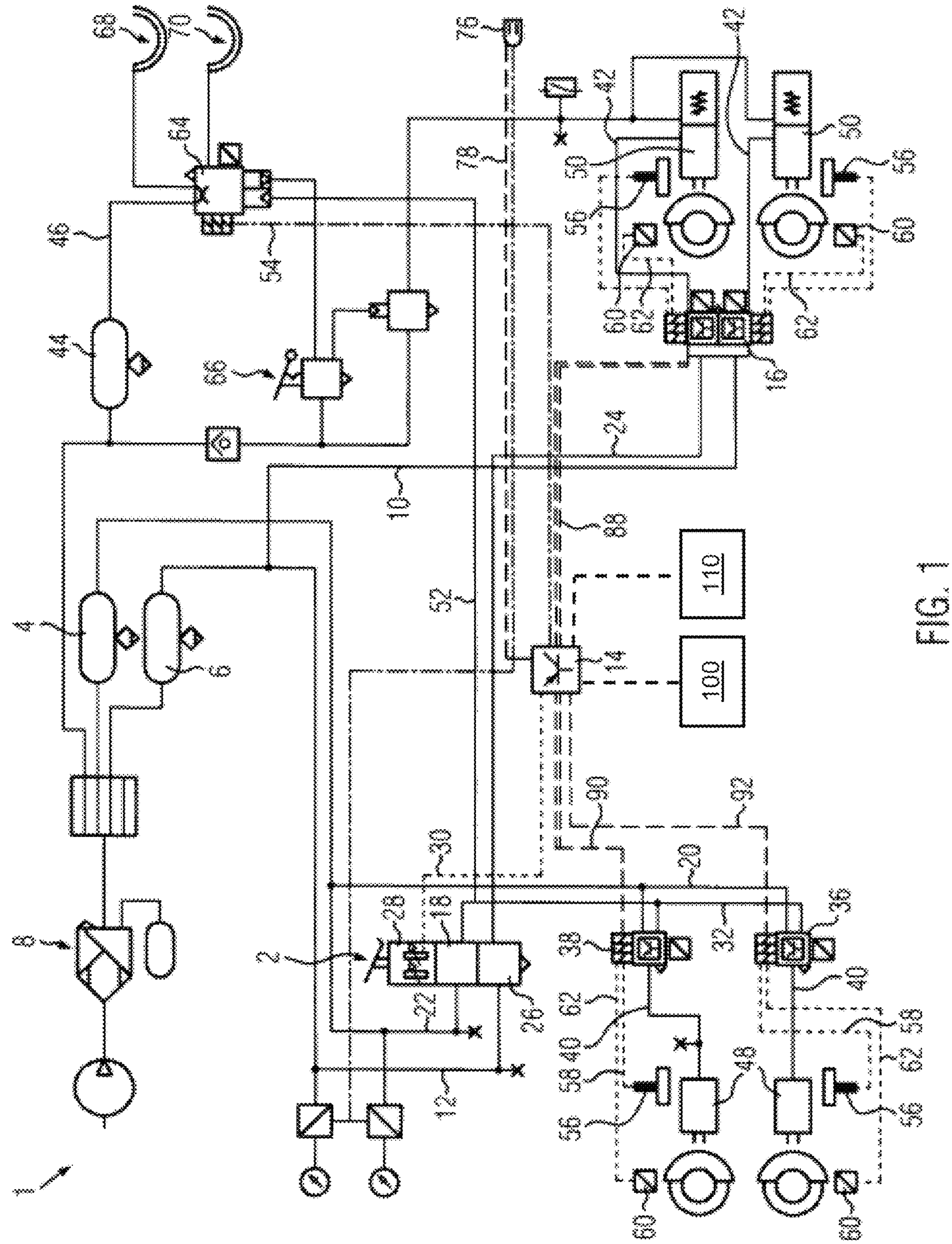
FIG. 1 shows a schematic wiring diagram of an exemplary embodiment of a device for stabilizing a vehicle in the event of a start-up situation from a standstill as part of an electro-pneumatic braking system of a towing vehicle of a towing vehicle/trailer combination.

FIG. 1 shows schematically an exemplary embodiment of a service braking system 1 of a towing vehicle of a towing vehicle-trailer combination. In the present case, the towing vehicle-trailer combination has only one 2-axle semi-trailer, but one or more drawbar trailers may also be attached to the towing vehicle.

The service braking system 1 of the towing vehicle is formed, for example, by an electro-pneumatic friction braking system in the form of an electronically controlled braking system (EBS; Electronic Braking system).

In such an electronically controlled braking system (EBS), there are axle-by-axle or wheel-by-wheel pressure control modules 16, 36, 38 with integrated inlet valves, outlet valves and backup valves as well as pressure sensors for detecting the actual brake pressure and with higher-level control electronics for comparing the actual brake pressures with the target brake pressures according to the respective braking request. The electronically controlled braking system (EBS) of the towing vehicle also contains a brake slip control system (ABS), whose ABS control routines may be integrated into a central brake control unit 14. Furthermore, the control routines of a traction control system (ASR), an electronic stability program (ESP) and a start-up stability function described later may be implemented in the central brake control unit 14 of the towing vehicle. The service braking system of the trailer, which is not shown here, may also be an electro-pneumatic braking system.

According to the circuit diagram of the electro-pneumatic service braking system 1 of the towing vehicle shown in FIG. 1, there is a foot brake sensor 2, a front axle supply pressure vessel 4 for supplying a front axle pressure circuit or a front axle pressure channel and a rear axle supply pressure vessel 6 for supplying a rear axle pressure circuit or a rear axle pressure channel. Air supply, air treatment and protection are carried out as required by law by an air treatment module 8, which is not described in more detail here.

The rear axle supply pressure vessel 6 is connected via pneumatic supply lines 10, 12 on the one hand to a supply connection of a 2-channel pressure control module 16 for the brake cylinders 50 of the rear axle and to a rear axle foot brake valve 26 of the foot brake sensor 2. In an analogous manner, the front-axle supply pressure vessel 4 is connected via pneumatic supply lines 20, 22 to supply connections of two 1-channel pressure control modules 36, 38, each assigned to a brake cylinder 48 of a front wheel, as well as to a front-axle foot brake valve 18 of the foot brake sensor 2.

The foot brake sensor 2 therefore contains two pneumatically acting foot brake valves 18, 26, which each generates a pneumatic back-up pressure or control pressure at the outputs of the foot brake valves 18, 26, depending on a brake request specified by the driver's foot on a brake pedal. Parallel to this, an electric front axle channel and an electric rear axle channel are combined in an electric channel 28 in the foot brake sensor 2, each of which, depending on the brake request, feeds an electric brake request signal into an electric connection, which may be in the form of a data bus 30, between the electric channel 28 of the foot brake sensor 2 and the central electronic brake control unit 14, which can distinguish between the brake request signals for the front axle and the rear axle, which are different, for example, for load reasons.

Furthermore, the front axle foot brake valve 18 and the rear axle foot brake valve 26 of the foot brake sensor 2 are each connected via a pneumatic control line 24, 32 to associated back-up connections of the 2-channel pressure control module 16 or the 1-channel pressure control modules 36, 38. Furthermore, a pneumatic brake line 40, 42 leads from working pressure connections of the 2-channel pressure control module 16 or the two 1-channel pressure control modules 36, 38 to the wheel-specific brake cylinders 48, 50 of the front axle and the rear axle.

Rotation rate sensors 56 report the current rotation rate of the rear wheels, which are driven here, for example, and the front wheels of the two-axle vehicle, which are not driven here, for example, via electric signal lines 58 to the central brake control unit 14. Wear sensors 60 may also be provided for each wheel brake, which, depending on the current brake wear, report signals via electric signal lines 62 to the central brake control unit 14.

Furthermore, a trailer control module 64 is provided, which is supplied with compressed air on the one hand by a trailer supply pressure vessel 44 on the towing vehicle side via a supply line 46 and on the other hand is pneumatically controlled by pneumatic control pressure, for example by back-up pressure of the front axle foot brake valve 18 of the foot brake sensor 2 via a control line 52. Furthermore, the trailer control module 64 also receives an electric signal from the central brake control module 14 via an electric control line 54. Finally, the trailer control module 64 is also controlled by a parking brake unit 66, which is not of interest here.

The trailer control module 64 typically contains an inlet solenoid valve and an outlet solenoid valve as well as a backup solenoid valve for pressure control of a relay valve that is also integrated and supplied by the trailer compressed air supply vessel 44 in order to control a control pressure for a "brake" coupling head 70 via these solenoid valves and the relay valve depending on a control signal fed in via the electric control line 54. The relay valve modulates the control pressure for the "brake" coupling head 70 from the supply pressure of the trailer supply pressure vessel 44 at its supply connection, depending on the control pressure formed by the solenoid valves. By an integrated pressure sensor, this control pressure for the "brake" coupling head 70 is measured and reported to the central brake control unit 14. If this priority electric control fails, the integrated back-up valve switches through and the relay valve is controlled by the pneumatic control pressure of the front axle brake circuit conducted in the control line 52. Finally, the trailer control module 64 passes the compressed air originating from the trailer compressed air supply vessel 44 through to a coupling head "vessel" 68 of the towing vehicle under supply pressure. The structure and functions of such an electro-pneumatic trailer control module 64 are well known and therefore do not need to be explained further here.

The brake application devices of the rear axle may be in the form of well-known combination cylinders, i.e. as a combination of an active service brake cylinder 50 and a passive spring-loaded brake cylinder. "Active" in this context means that the service brake cylinders 50 clamp when ventilated and release when vented, and "passive" means that the spring-loaded brake cylinders clamp when vented and release when ventilated. On the wheels of the front axle, on the other hand, only active service brake cylinders 48 are provided.

The electro-pneumatic 2-channel pressure control module 16, which is implemented as a unit, has two separately controllable pressure control channels, wherein for each pressure control channel a regulated working pressure for the brake cylinders 50 of the rear axle is generated at the respective working pressure connections on the basis of supply air originating from the rear axle compressed air supply vessel 6 depending on the brake request signal of the foot brake sensor 2, and is measured by the integrated pressure sensors, in order to adjust or regulate the measured actual brake pressure to the target brake pressure according to the brake request. In an analogous way, the brake pressure is controlled individually in each 1-channel pressure control module 36, 38 of the front axle for the two brake cylinders 48 of the wheels of the front axle.

For the formation of pneumatically circuit-separated pressure control channels (for example here: front axle pressure control channel or rear axle pressure control channel), each pressure control channel is consequently assigned its own compressed air supply vessel 4, 6, wherein the pneumatic flow paths of each pressure control channel, starting from the associated compressed air supply vessel 4, 6 via the associated pressure control modules 16, 36, 38 to the associated brake application devices 48, 50, are formed pneumatically separately from the pneumatic flow path of a respective other pressure control channel.

For the formation of an electro-pneumatic braking system with primary electrically operated pressure control channels (front axle pressure control channel or rear axle pressure control channel) and a secondary pneumatic fallback level in the event of a failure of the electric system, each pressure control module 16, 36, 38 may particularly be assigned its own back-up circuit, with its own back-up valve for the control of a pneumatic back-up or control pressure derived from the control pressure of the compressed air vessel 4, 6 associated with the respective pressure control system of the rear axle or the front axle and formed by the foot brake sensor 2, from which the respective brake pressure is formed at the working pressure connections of the pressure control modules 16, 36, 38 in the event of a failure of electric components.

The braking system 1 of the towing vehicle and the braking system of the trailer are, as is customary with such braking systems, coupled to each other by a "supply" coupling head 68 and by a "brake" coupling head 70.

Since the trailer control module 64 does not have its own electronic control unit, for example, the electric brake control signals must be transmitted from the central brake control unit 14 to the trailer via a "trailer" CAN-BUS 78 and an electronic trailer interface 76, as the trailer has an electro-pneumatic braking system, for example. The trailer control module 64 as well as the 2-channel pressure control module 16 and the two 1-channel pressure control modules 36, 38 are each controlled by the central brake control unit 14 via an electric control line 54, 88, 90, 92.

Against this background, the functioning of the braking device is as follows: During a normal braking process, the driver actuates the brake pedal and thus the foot brake sensor 2, whereby an electric brake request signal is generated in the electric channel 28 analogous to the desired target deceleration and is introduced into the central brake control unit 14, which then controls the trailer control module 64, the 2-channel pressure control module 16 and the two 1-channel pressure control modules via the electric control lines 54, 88, 90, 92 according to the brake request signal and possibly depending on other parameters such as the respective load. The integrated inlet solenoid valves, outlet solenoid valves and any back-up solenoid valves, which are usually in the form of 2/2-way solenoid valves, are switched according to the brake request so that they pneumatically control the relay valves, which are also integrated, in order to introduce a target brake pressure or target control pressure according to the brake request into the relevant brake cylinders 48, 50 of the towing vehicle and on the trailer side into the trailer control valve 80, which modulates the brake pressure for the brake cylinders 84 of the trailer from the target control pressure. The pressure sensors integrated in the pressure control modules 16, 36 and 38 and in the trailer control module 64 then report the actual brake pressure or actual control pressure to the central brake control unit 14, which then regulates the target brake pressure or target control pressure by controlling the solenoid valves on the module side.

If the brake request signal for the central brake control unit 14 is generated autonomously by a driving assistance system such as ESP or ACC or by an autopilot instead of by the foot brake sensor 2, the same functions will be performed as described above.

If the brake slip of one or more wheels of the towing vehicle exceeds a specified brake slip limit of, for example, 12% to 14%, which can be determined by the wheel rotation rate sensors 56, the brake slip control or the ABS of the towing vehicle responds. By corresponding control of the solenoid valves in the pressure control module 36, 38 assigned to the respective wheel with brake slippage or in the pressure control module 16 assigned to the wheels with brake slippage, the brake pressures for the towing vehicle are adjusted by the ABS routines implemented in the central brake control unit 14 in such a way that the brake slip control difference is compensated.

Compatibility bands are stored in the central brake control unit 14, which determine the ratio between the desired braking z of the towing vehicle/trailer combination and the resulting braking force of the trailer or the pressure on the "brake" coupling head of the towing vehicle. The brake pressure for the braking system of the trailer resulting from the compatibility band can then still be optionally modified by a coupling force control. Then the trailer control module 64 is controlled by the central brake control unit 14 to adjust the pneumatic control pressure in the "brake" coupling head for the trailer according to these specifications. Thus, the brake pressure in the trailer would be formed depending on the brake pressure in the towing vehicle influenced by the brake slip control.

A device for stabilizing the towing vehicle in the event of a start-up situation from a standstill is integrated into the service braking system 1, for example. The start-up stability function mentioned above is implemented as a program or program part in the central brake control unit 14. The device also includes the rotation rate sensors 56 on the driven rear wheels and the non-driven front wheels, or evaluates their rotation rate signals, in particular in a start-up situation or in the course of a start-up situation. The device also contains a sensor module 100, in which, for example, a rotation rate sensor and a lateral acceleration sensor are integrated. The sensor module 100 has a signal transfer connection to the central brake control unit 14 in order to be able to carry out the ESP functions on the one hand—as mentioned above. On the other hand, however, it is also used to provide rotation rate signals and lateral acceleration signals for the start-up stability function implemented here in the central brake control unit 14, for example. Furthermore, the central brake control unit 14 has a signal transfer connection to an electronic drive control unit 110, for example via a data bus. The electronic drive control unit 110 controls a driving machine of the towing vehicle, for example an internal combustion engine and/or an electric machine, in terms of rotation rate, drive torque and/or drive power. Here, for example, the driving machine drives the rear wheels, but not the front wheels of the towing vehicle.

Figure 2:
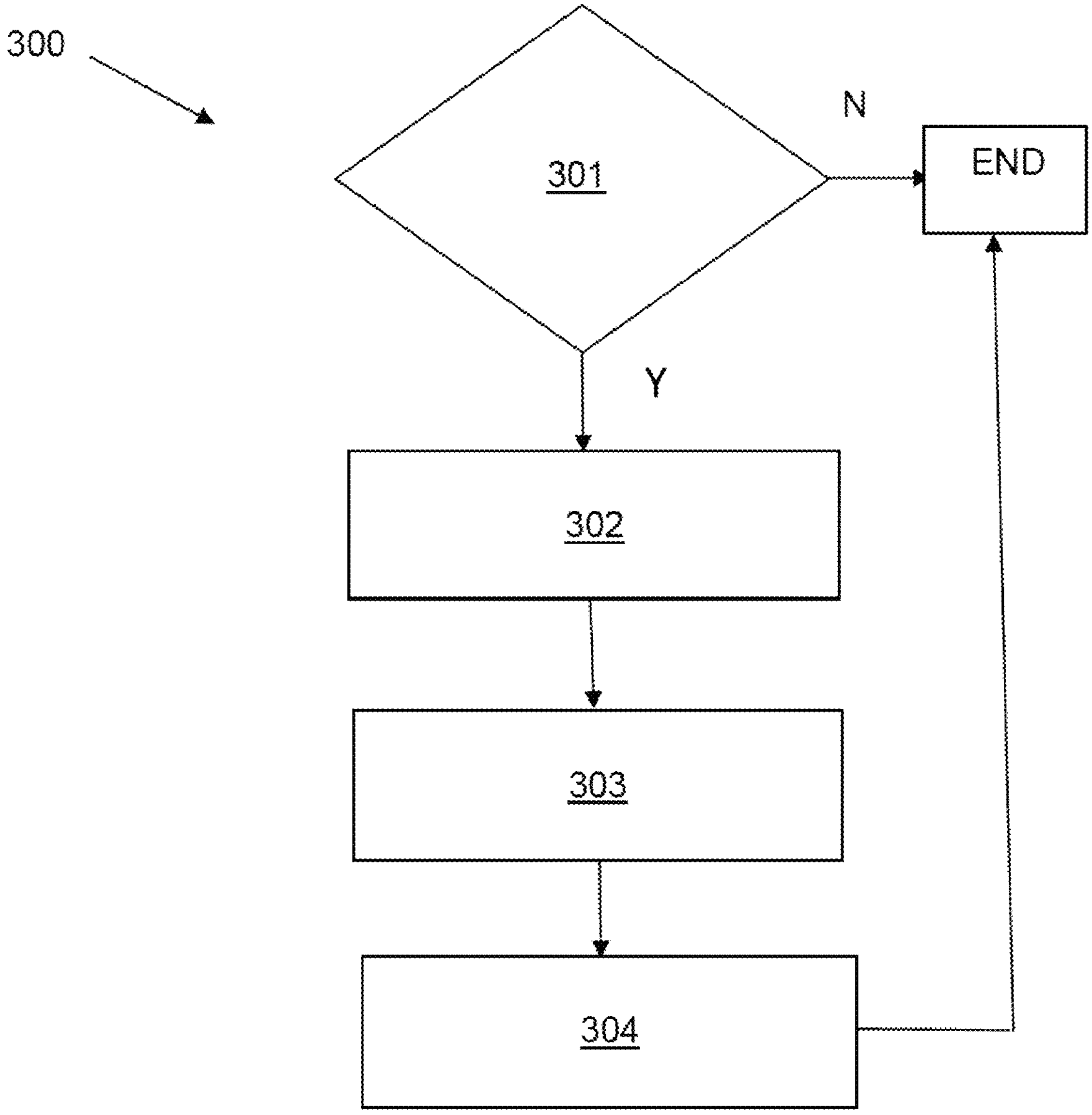
FIG. 2 shows a flow diagram of an exemplary embodiment of the method according to the invention for stabilizing a vehicle in a start-up situation from a standstill.

The operation of the start-up stability function is shown in FIG. 2 as a flow diagram of a method 300 for stabilizing the towing vehicle in a start-up situation from a standstill. The start-up situation can be triggered by a driver of the towing vehicle or autonomously, in particular by an autopilot.

In a step 301, it is checked whether there is a start-up situation of the towing vehicle, which may be by evaluating the rotation rate signals of the rotation rate sensors 56 on the non-driven front wheels. These rotation rate signals can be used to detect the standstill and the vehicle speed v of the towing vehicle. The start-up situation exists here, for example, if a driving speed v between zero and a lower vehicle limit speed, for example between 3-5 km/h, is detected ("Y" for "Yes"). If no start-up situation ("N" for "No") is detected, the method is aborted ("END").

In the case of a detected start-up situation, the actual behavior of the vehicle is then determined in a subsequent step 302 with regard to the lateral dynamics of the towing vehicle. For this purpose, for example, the actual rotation rate signals received by the sensor module 100 are evaluated in the central brake control unit 14.

In a subsequent step 303, a deviation of the actual behavior of the vehicle from a target behavior of the vehicle with regard to the lateral dynamics of the vehicle is determined, in this case, for example, by determining a deviation of the actual rotation rate represented by the actual rotation rate signals from a target rotation rate. The deviation is formed, for example, by a difference between the target rotation rate and the actual rotation rate. The magnitude of this difference may be determined.

The target rotation rate may be determined using the single-track model according to the following equation:

$$\psi = \frac{\delta * v}{l_{wh} + EG * v^2}$$

with:

ψ=target rotation rate

δ=wheel steering angle v=vehicle speed

EG=self-steering gradient $L_{wh}$=WHEELBASE

The vehicle speed (v) may be detected by evaluating the rotation rate of the non-driven front wheels. Alternatively, a predetermined value can also be used as the target rotation rate.

In addition, or alternatively, the actual lateral acceleration detected by the lateral acceleration sensor in the sensor module 100 can be evaluated in the central brake control unit 14 and compared with a target lateral acceleration. The deviation is then formed, for example, by a difference between the target lateral acceleration and the actual lateral acceleration. The magnitude of this difference may be determined.

In a subsequent step 304, an adjustment of the drive torque is carried out as a function of the deviation, for example by the central brake control unit 14 controlling the drive control unit directly in order to adjust and, in particular, reduce the drive torque of the driving machine. For example, the greater the deviation, the more the drive torque generated by the driving machine during the start-up situation can be reduced. Also, for example, the drive torque generated by the driving machine in the course of the start-up situation can only be reduced if the deviation has exceeded a limit value. The reduction of the drive torque increases the lateral dynamic stability in the start-up situation because greater lateral guidance force is then available at the driven wheels of the towing vehicle.

THE REFERENCE NUMERAL LIST IS AS FOLLOWS

1 service braking system of the towing vehicle
2 foot brake sensor
4 front axle supply pressure vessel
6 rear axle supply pressure vessel
8 air treatment module
10 supply Line
12 supply line
14 brake control unit

16 2-channel pressure control module
18 front axle foot brake valve
20 supply line
22 supply line
24 control line
26 rear axle foot brake valve
28 electric channel
30 data bus
32 control line
36 1-channel pressure control module
38 1-channel pressure control module
40 brake line
42 brake line
44 trailer supply pressure vessel on the towing vehicle side
46 supply line
48 front axle brake application device
50 rear axle brake application device
52 control line
54 electric control line
56 rotation rate sensors
58 electric signal lines
60 wear sensors
62 electric signal lines
64 trailer control module
66 parking brake unit
68 “supply” coupling head
70 “brake” coupling head
76 trailer interface
78 trailer data bus
88 electric control line
90 electric control line
92 electric control line
100 sensor module
110 drive control electronics

What is claimed is:

1. A method for stabilizing a vehicle in a start-up situation from a standstill, the vehicle being driven by a driving machine which generates a driving torque on driven wheels during the start-up process, the method comprising:

a) detecting the start-up situation of the vehicle, wherein the start-up situation is detected by determining that a vehicle speed of the vehicle, detected by at least one sensor, increases from zero to a lower vehicle limit speed;

b) determining, based on detecting the start-up situation, an actual behavior of the vehicle in relation to lateral dynamics of the vehicle, and c) determining a deviation of the actual behavior of the vehicle from a target behavior of the vehicle with regard to the lateral dynamics of the vehicle; and d) adjusting the drive torque depending on the deviation;

wherein based on determining that the deviation exceeds a limit value, the drive torque generated by the driving machine is reduced.

2. The method of claim 1, wherein a detected actual vehicle rotation rate of the vehicle represents the actual behavior of the vehicle and a target rotation rate of the vehicle represents the target behavior of the vehicle.

3. The method of claim 2, wherein the target rotation rate of the vehicle is determined by the single-track model according to the following equation:

$$\psi = \frac{\delta * v}{l_{wh} + EG * v^2}$$

with:

ψ=target rotation rate δ=wheel steering angle

V=vehicle speed

EG=self-steering gradient $l_{wh}$=wheelbase.

4. The method of claim 3, wherein the vehicle speed is detected by evaluation of the rotation rate of at least one non-driven wheel.

5. The method of claim 2, wherein a predetermined value is used as the target rotation rate of the vehicle.

6. The method of claim 1, wherein a detected actual lateral acceleration of the vehicle represents the actual behavior of the vehicle and a target lateral acceleration of the vehicle represents the target behavior of the vehicle.

7. The method of claim 1, wherein the start-up situation of the vehicle is detected by evaluating the rotation rate of at least one non-driven wheel.

8. The method of claim 1, wherein the limit value is fixed, or depends on a lower vehicle limit speed, from which wheel rotation rates can be detected.

9. The method of claim 8, wherein the greater the deviation, the drive torque generated by the driving machine during the start-up process is reduced more.

10. The method of claim 9, wherein at least in the start-up situation the drive slip is determined and the reduction of the drive torque is carried out so that a maximum permissible drive slip is specified for the driven wheels which is less than a target drive slip specified by a traction control system (ASR).

11. The method of claim 10, wherein the adjustment of the drive torque is effected by controlling the driving machine to adjust the drive torque.

12. The method of claim 1, wherein the start-up situation is controlled or triggered by a driver of the vehicle or autonomously.

13. The method of claim 1, wherein the lower vehicle speed limit is between 3-5 km/hr.

14. The method of claim 1, wherein reducing the drive torque means that a lower drive torque is requested compared to a drive torque requested by a driver of the vehicle or autonomously.

15. The method of claim 1, wherein steps b), c) and d) are performed only when the start-up situation is detected.

16. An apparatus for stabilizing a vehicle in a start-up situation from a standstill, the vehicle being driven by a driving machine which generates a driving torque on driven wheels during the start-up process, comprising:

a) a first means for detecting the start-up situation of the vehicle, wherein the start-up situation is detected by determining that a vehicle speed of the vehicle, detected by at least one sensor, increases from zero to a lower vehicle limit speed;

b) a second means for determining, based on detecting the start-up situation, an actual behavior of the vehicle with regard to the lateral dynamics of the vehicle, and for determining a deviation of the actual behavior of the vehicle from a target behavior of the vehicle with regard to the lateral dynamics of the vehicle; and c) a third means for adjusting the driving torque as a function of the deviation;

wherein based on determining that the deviation exceeds a limit value, the drive torque generated by the driving machine is reduced.

17. The apparatus of claim 16, wherein:

a) the first means includes at least one wheel rotation rate sensor on a non-driven wheel for generating a wheel rotation rate signal and an electronic controller with a signal transfer connection to this for evaluating the wheel rotation rate signal, wherein the electronic controller determines that the vehicle speed increases from zero to the lower vehicle speed limit based on the wheel rotation rate signal, b) the second means includes at least one rotation rate sensor for generating a rotation rate signal and/or at least one lateral acceleration sensor for generating a lateral acceleration signal and the electronic controller with a signal transfer connection to this for evaluating the rotation rate signal and/or the lateral acceleration signal, and c) the third means includes the electronic controller, which includes:

c1) a drive control electronic system with a signal transfer connection to the electronic control system, which receives and implements a drive control signal generated by the electronic control system depending on the deviation, or c2) a traction control system (ASR) with a signal transfer connection to the electronic control system, which receives and implements a slip specification signal representing a maximum permissible drive slip generated by the electronic control system depending on the deviation.

18. The apparatus of claim 16, wherein the lower vehicle speed limit is between 3-5 km/hr.

19. The apparatus of claim 16, wherein reducing the drive torque means that a lower drive torque is requested compared to a drive torque requested by a driver of the vehicle or autonomously.

* * * * *